(12) United States Patent
Bozionek et al.

(10) Patent No.: US 8,713,310 B2
(45) Date of Patent: Apr. 29, 2014

(54) METHOD AND DEVICE FOR AUTHENTICATING TRANSMITTED USER DATA

(75) Inventors: Bruno Bozionek, Borchen (DE); Karl Klaghofer, Munich (DE); Holger Prange, Munich (DE); Werner Schneider, Munich (DE); Michael Tietsch, Kaufering (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 467 days.

(21) Appl. No.: 12/676,655

(22) PCT Filed: Sep. 6, 2007

(86) PCT No.: PCT/EP2007/007790
§ 371 (c)(1),
(2), (4) Date: Aug. 31, 2010

(87) PCT Pub. No.: WO2009/033492
PCT Pub. Date: Mar. 19, 2009

(65) Prior Publication Data
US 2011/0040966 A1  Feb. 17, 2011

(51) Int. Cl.
*H04L 29/06* (2006.01)
*G06F 21/00* (2013.01)

(52) U.S. Cl.
USPC ............................................ 713/161; 726/11

(58) Field of Classification Search
USPC .................. 713/150, 161, 167–170; 380/255
See application file for complete search history.

(56) References Cited

U.S. PATENT DOCUMENTS

| | | | | |
|---|---|---|---|---|
| 6,088,450 A | * | 7/2000 | Davis et al. | 713/182 |
| 2001/0050907 A1 | * | 12/2001 | Madour et al. | 370/329 |
| 2002/0087858 A1 | * | 7/2002 | Oliver et al. | 713/156 |
| 2002/0124169 A1 | * | 9/2002 | Agrawal et al. | 713/168 |
| 2003/0167394 A1 | | 9/2003 | Suzuki et al. | |
| 2004/0107342 A1 | * | 6/2004 | Pham et al. | 713/165 |
| 2005/0074120 A1 | * | 4/2005 | Vidakovic | 380/255 |
| 2005/0251431 A1 | * | 11/2005 | Schmidtberg | 705/6 |
| 2005/0251676 A1 | | 11/2005 | Shah et al. | |
| 2005/0271073 A1 | * | 12/2005 | Johnsen et al. | 370/428 |
| 2006/0075229 A1 | * | 4/2006 | Marek | 713/168 |
| 2007/0044155 A1 | * | 2/2007 | Pletka et al. | 726/25 |
| 2007/0237144 A1 | * | 10/2007 | Adhikari et al. | 370/392 |

OTHER PUBLICATIONS

English translation of the International Search Report (Form PCT/ISA/210) for PCT/EP2007/007790.
Written Opinion of the International Searching Authority (Form PCT/ISA/237) for PCT/EP2007/007790.

* cited by examiner

*Primary Examiner* — Gilberto Barron, Jr.
*Assistant Examiner* — David Le
(74) *Attorney, Agent, or Firm* — Buchanan Ingersoll & Rooney PC

(57) ABSTRACT

The invention relates to a method for transmitting user data, particularly user data realizing real-time applications, between at least one first communication device and at least one second communication device, the user data being transmitted as data packets during a communication connection, wherein during the communication connection at least from the first communication device at least one packet enabling an authentication of the first communication device is embedded in at least one of the data packets transmitting the user data and directed at the second communication device. The invention furthermore relates to an arrangement for carrying out the method.

20 Claims, 1 Drawing Sheet

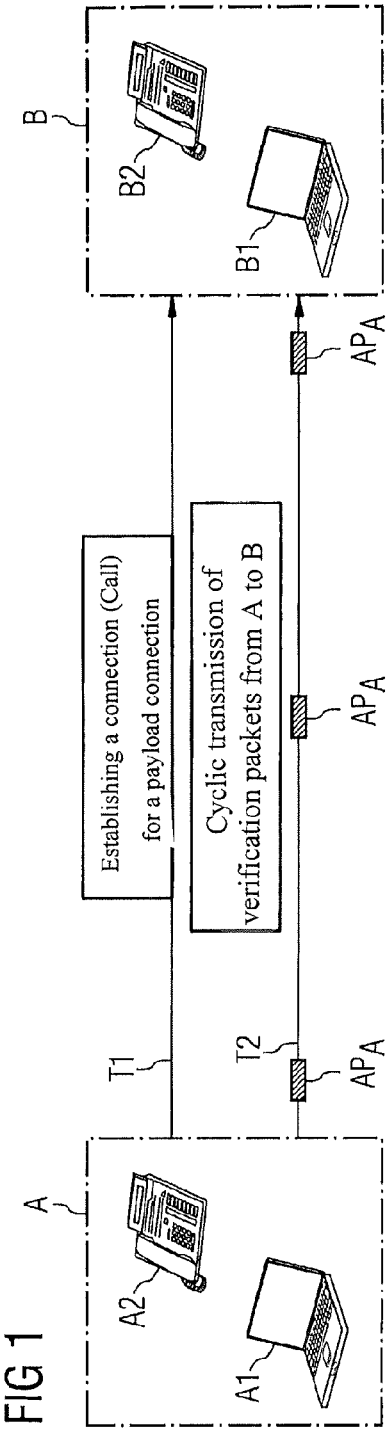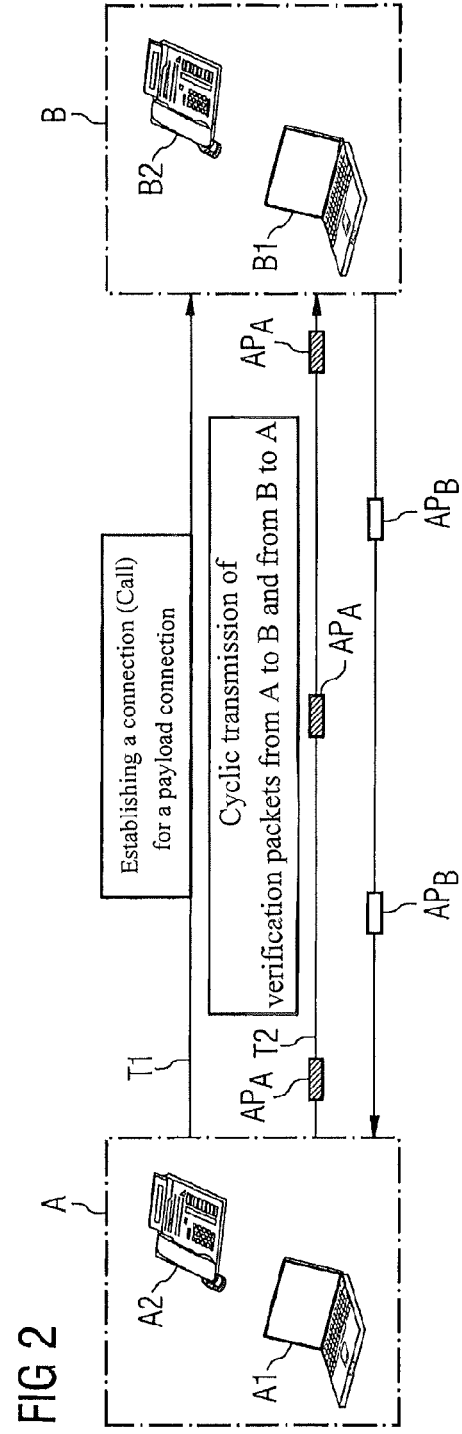

METHOD AND DEVICE FOR AUTHENTICATING TRANSMITTED USER DATA

CROSS-REFERENCE TO RELATED APPLICATIONS

This application is the United States national phase under 35 U.S.C. §371 of PCT International Application No. PCT/EP2007/007790, filed on Sep. 6, 2007. That application is incorporated by reference herein.

BACKGROUND OF THE INVENTION

1. Field of the Invention

Embodiments of the invention relate to methods for transmitting payload data, in particular payload data that implement real-time applications and an arrangement for transmitting payload data that in particular implement real-time applications.

2. Background of the Art

Transmission of real-time critical data through a communication network is well known in the art. One application involving such data transmissions is Voice-over-IP (VoIP) Telephony, which is quickly becoming more important, since telephony is shifting more and more to data networks, in particular to the internet.

This shift is associated with an increased risk of harmful attacks in VoIP connections, similar to those observed for some time in data networks. Unlike attacks on regular data connections, VoIP attacks often cannot be detected with certainty until after the payload data have been generated, due to their real-time nature. At that point, the associated nuisances and/or damages have already occurred.

It would be helpful to provide a method and communication device for transmission of payload data that, in particular, implement real-time applications in order to increase security against attacks from unauthorized third parties.

BRIEF SUMMARY OF THE INVENTION

In preferred embodiments of the invented method for transmitting payload data that implement real-time applications between at least one first communication device and at least one second communication device, whereby the payload data will be transmitted as data packets during a communication connection, at least one packet enabling authentication of the first communication device will be embedded during the communication connection in at least one payload-data-transmitting data packet that is directed to a second communication device by the first communication device.

A significant advantage of the invented method is that, due to the inclusion of payload data in the authentication packets, it is possible for the communication device receiving the payload data to continuously determine whether the communication partner really is the identified communication partner. Inclusion in the payload data provides the advantage that just the data alone can be transmitted to the receiving communication device, since although there may be requirements for the header data of payload data packets, there are no requirements regarding the content. Therefore, the invented method provides the added benefit of easy implementation in existing systems. Furthermore, it is suitable for systems where the trustworthiness of the receiving communication device is without question.

Additionally, it provides the advantage, if the method is developed in this way, that during a communication connection, at least one packet enabling authentication of the second communication device will be embedded during the communication connection in at least one payload-data-transmitting data packet that is directed to the first communication device by the second communication device. In this way, both communication devices will be secured by a preferential method according to the invention.

If the first and/or second communication device requests the transmission of authentication-enabling packets upon receiving payload data, this will create a degree of freedom during implementation of the method in that, for example, authentication could be requested at a later randomly selected point in time, or, before the request, an evaluation could be performed to see whether the sending communication partner is actually capable of performing the authentication according to the invention and, if necessary, alternate protective mechanisms could be employed.

Preferably, the first and/or second communication device will examine the data packets for the presence of at least one authentication-enabling packet, and if no authentication-enabling packet is detected, the communication connection will be terminated. This further embodiment has the benefit of easy implementation.

Furthermore, it is preferential for the examination to occur within a defined first time span and the lack of detection to be determined by the end of this time span. This ensures defined states and termination during execution of the method.

Alternatively or in addition, if the authentication-enabling packet is missing, the receiving communication device will request the authentication-enabling packet from the sending communication device, and if the requested packet does not arrive, the communication connection will be terminated. This further embodiment provides the advantage that accidental interruption due to too short time windows or to long transmission times of packets is mostly eliminated, since the sending device will get a second chance due to this explicit query.

Preferentially, the authentication-enabling packet will be embedded as a packet with at least one header field with at least one piece of information characterizing this function, to allow for easy detection within the payload data. Furthermore, a header field provides advanced possibilities for checking the packet.

A more preferred embodiment is to re-embed at predetermined times during the communication connection between the first communication device and the second communication device. This ensures that no attacker will be able to enter between the communication partners at a later time and behave as if it were the other communication device.

Easy implementation is ensured when the determination is made in such a way that re-embedding occurs at equal time intervals.

Alternatively, the determination can be made in such a way that re-embedding occurs at different time intervals, in particular, in pseudo-randomized durations. This makes it difficult for attackers to easily use an authentication packet by successfully spying on the payload data, since in addition to the packet, the attackers would also need the communications partners' shared knowledge about the pseudo-randomized algorithm.

If at least one piece of authentication information is inserted in the authentication-enabling packet such that at every re-embedding the inserted information will be different from the previously inserted information, it will be even more difficult for an attacker to corrupt the communication downstream from the point of interception when intercepting an authentication packet, since the attacker does not have any knowledge about the changing information.

This becomes even more difficult if the authentication-enabling packet is provided with at least one encryption key identification, password and/or information encrypted with a special "PKI" key.

The invented arrangement for transmitting payload data that implement real-time applications between at least one first communication device and at least one second communication device, which are designed in such a way that the payload data are transmitted as data packets during a communication connection, provides means for the execution of the method according to the aforementioned embodiment and provides a preferential physical basis for execution of the method.

Further details of the invention and its advantages will be further described in a first embodiment illustrated in FIG. 1 and a second embodiment of the invention illustrated in FIG. 2.

BRIEF DESCRIPTION OF THE FIGURES

FIG. 1: Schematic of unidirectional embedment of authentication packets in payload data packets;

FIG. 2: Schematic of bidirectional embedment of authentication packets in payload data packets.

DETAILED DESCRIPTION OF THE INVENTION

FIG. 1 shows a first embodiment of the invention. It shows a first communication device A; A1 . . . A2 and a second communication device B; B1 . . . B2, whereby it is further shown that basically the communication device according to the invention can be a data processing unit, such as a personal computer or a portable computer (laptop, notebook) A1; B1 with suitable VoIP software, or a special VoIP hardware item such as a VoIP-capable telephone A1;B2.

The invention concerns in particular the specific attack where, after establishment of a payload data connection, a voice data stream originating from one of the communication devices A; A1 . . . A2; B; B1; B1 . . . B3 of a subscriber is intercepted and replaced by a manipulated voice data stream which may originate from a human or electronic voice imitator.

Thus the illustrated embodiment is activated at a first point in time T1 with the establishment of a connection, which may be triggered by the first communication device A; A1 . . . A2, for example, by a call to the second communication device B; B1 . . . B2, which is well known in telephony.

As a result of this call, the illustrated example assumes that a communication connection was established.

Therefore, at a second point in time T2, a payload data transmission occurs, which may be from the first communication device A; A1 . . . A2 to the second communication device B; B1 . . . B2, or from the second communication device B; B1 . . . B2 to the first communication device A; A1 . . . A2.

In this first embodiment, regardless of whether payload data is transmitted in both communication directions A; A1 . . . A2; or not, a payload data stream will be sent only from the first communication device A; A1 . . . A2, and the invented authentication packets APa—packets are not shown—will be embedded only in this payload data stream.

It is also feasible to implement this approach in systems or in applications where, for example, the almost real-time transmission of collected data to an evaluation center occurs, as is the case in video and/or audio monitoring of objects via cameras or microphones that are capable of communicating with a central unit.

The authentication packets arriving at the second communication device B; B1 . . . B2 will then be extracted accordingly from the respective payload data packets and examined.

For this purpose, the second communication device has knowledge about the form of the authentication information by following the same algorithm to arrive at the information and/or transmission time, or the information and/or points in time are saved in a second communication device, which may be assigned to known communication devices by assignment through a mapping table.

Depending on the verification result, the communication connection is then maintained, and the payload data forwarded for appropriate processing, or the communication is interrupted or the payload data are discarded or forwarded for analysis of an attack.

FIG. 2 shows a second embodiment of the invention. The illustrated arrangement does not differ from the first embodiment, so the identical elements of the first embodiment are identified with the same reference symbols, while the new elements of the invented second embodiment received new reference symbols.

It shows again the first communication device A; A1 . . . A2 and the second communication device B; B1 . . . B2, which again are basically a data processing unit, like a personal computer or a portable computer (laptop, notebook) A1; B1 with suitable VoIP software, or special VoIP hardware item such as a VoIP-capable telephone A2; B2.

Again, there is a call at the first point in time T1 from the first communication device A; A1 . . . A2 to establish a communication connection with the second communication device B; B1 . . . B2.

Differently from the previous embodiment, this example provides that upon successful establishment of the communication connection between the first communication device A; A1 . . . A2 and the second communication device B; B1 . . . B2 at a second point in time T2, not only will bidirectional transmission of payload data occur, but also embedment of authentication packets $AP_A$; $AP_B$, from both the first communication device A; A1 . . . A2, indicated by black rectangles $AP_A$, and the second communication device B; B1 . . . B2, indicated by gray rectangles $AP_B$, in the payload data packets sent by the respective device.

The illustrated examples relate primarily to a VoIP-enabled scenario, however, this invention is in no way limited to these examples. It can be implemented anyplace where real-time critical applications transmit payload data, regardless of whether the transmission is unidirectional (e.g., monitoring) or bidirectional (telecommunications).

In summary, the described embodiments illustrate that the core of the invention is to embed verification packets at predetermined regular or irregular time intervals in payload data stream for authentication and authorization, whereby these are identified as such in the packet header according to a further embodiment and where they generally do not impair the payload data in any way.

Various standardized methods offer the possibility to define such packets, which are identified in the header and are otherwise proprietary prior to final standardization of the invented method.

These packets may include certain sender-specific safety features, such as key identifiers, passwords, information encrypted with a (PKI) key, or similar features.

As described, the receiver will check the receipt and content of the packets and may, if such packets do not arrive or if the content is unsuitable, initiate appropriate actions, like expressly requesting such packets or terminating the connection.

Embodiments of the invention may offer an advantage that routers can route these packets easily, since the described method does not affect the internet protocol level.

A further advantage is that other devices, in particular terminals, will merely discard such packets if the defined packet type is unknown, so that (unsecured) communication is still possible as a fallback resort.

In a further embodiment, the packet content may be modified at predefined time intervals in a pseudo-randomized way that is known only to the partners, in order to prevent such packets from being intercepted and replaced by manipulated ones. Further measures to defend against so-called replay attacks can easily be applied in a preferred further embodiment of the invention.

Further, the invention can be summarized in that verification packets which are specifically identified within the payload connection may be sent either unidirectionally from the first communication device A; A1 . . . A2 to the second communication device B; B1 . . . B2, wherein only the second communication device B; B1 . . . B2 has the task of checking the validity of the verification packets and responding, if applicable, to invalid or missing packets as described above, or, to overcome the disadvantage of this variation, which is that the first communication device A; A1 . . . A2 has no knowledge of the authenticity of the second communication device B; B1 . . . B2, by sending bidirectionally, in which variation both the first communication device A; A1 . . . A2 and the second communication device B; B1 . . . B2 have the task of verifying the validity of the opposite side's verification packets and responding in the described way, so that mutual control is implemented.

According to embodiments of the invention, it is not necessary to check, in particular, a voice data stream continuously for accuracy and consistency of the speaker-characteristic frequency patterns or speech characteristics, since the invention provides more or, depending on application frequency, less dense partner verification during the payload data exchange, which is completely adequate for high-probability detection of an attack, in particular a "Man in the Middle" attack.

Compared to the methods known in the state of the art, which execute speaker verification during VoIP connections that takes place solely during establishment of the connection, i.e. prior to the actual payload data exchange, the invention provides a solution for simple implementation of protection.

This is shown by a comparison with the "Man-in-the-Middle" defense method well known in the state of the art, where key data are exchanged at or prior to establishing the payload data connection, e.g., by exchanging key data to authenticate the partners and to encrypt the payload data, which is certainly an effective method, but has the disadvantage that both partners must have similar, technically extensive equipment.

In the event that at least one partner does not possess such technically extensive equipment, the invention provides a solution that is less technically demanding, but yet guarantees continuous partner verification during the payload data connection.

Further it provides the advantage of backward compatibility with existing standardized methods for payload data exchange.

The invention claimed is:

1. A method for transmitting payload data that implement at least one real-time application between at least one first communication device and at least one second communication device, the at least one first communication device comprising a first communication device and the at least one second communication device comprising a second communication device, wherein the payload data will be transmitted as data packets during a communication connection, the data packets comprising first data packets and second data packets, the method comprising:
    at a first time period, during the transmission of the data packets between the first and second communication devices, the first communication device embedding at least one first data packet of the first data packets with first authentication information enabling authentication of the first communication device;
    the first communication device transmitting the first data packets to the second communication device;
    the second communication device receiving the first data packets and extracting the first authentication information embedded within the at least one first data packet of the first data packets;
    upon a determination that the first authentication information authenticates the first communication device, the second communication device maintaining the communication connection and forwarding the first data packets for appropriate processing;
    at a second time period that is after the first time period, and during the transmission of data packets between the first and second communication devices, the first communication device embedding at least one second data packet of the second data packets with first authentication information enabling authentication of the first communication device;
    the second communication device receiving the second data packets an amount of time after the receipt of the first data packets and forwarding of the first data packets;
    the second communication device extracting the first authentication information embedded within the at least one second data packet of the second data packets; and
    upon a determination that the first authentication information authenticates the first communication device, the second communication device maintaining the communication connection and forwarding the second data packets for appropriate processing.

2. The method of claim 1, wherein the data packets also comprise a plurality of third data packets, the method comprising:
    during the communication connection:
        at a third time period, during the transmission of the data packets between the first and second communication devices, the second communication device embedding at least one third data packet of the third data packets with second authentication information enabling authentication of the second communication device;
        the second communication device transmitting the third data packets to the first communication device;
        the first communication device receiving the third data packets and extracting the second authentication information embedded within the at least one third data packet of the third data packets; and
        upon a determination that the second authentication information authenticates the second communication device, the first communication device maintaining the communication connection and forwarding the third data packets for appropriate processing.

3. The method of claim 2, wherein at least one of the first communication device and the second communication device requests transmission of authentication-enabling packets upon receiving payload data.

4. The method of claim 3, comprising:
terminating the communication connection by the first communication terminal if the second authentication information is not found within the third data packets.

5. The method of claim 4, comprising:
upon a predetermined period of time passing without receipt of the at least one first data packet having the embedded first authentication information of the first data packets, the second communication device terminating the communication connection.

6. The method of claim 4, comprising:
upon a predetermined period of time passing without receipt of the at least one second data packet having the embedded first authentication information of the second data packets, the second communication device terminating the communication connection.

7. The method of claim 1, wherein the at least one first data packet of the first data packets has the first authentication information embedded therein such that the at least one first data packet is a data packet having at least one header field with at least one piece of information that identifies that data packet as having authentication information.

8. The method of claim 2, wherein the second time period is a predetermined amount of time after the first time period and is also after the third time period.

9. The method of claim 8, wherein the first communication device and the second communication device are each a data processing unit having telephony functionality.

10. The method of claim 8, wherein the second communication device has knowledge about a form of the first authentication information prior to the first authentication information being embedded.

11. The method of claim 8, comprising:
inserting at least one first piece of information in the at least one first data packet of the first data packets; and
inserting at least one second piece of information in the at least one second data packet of the second data packets that is different than the at least one first piece of information.

12. The method of claim 1, wherein the first authentication information is information of the group consisting of an encryption key identifier, a password, and a piece of information with "PKI" key encrypted data.

13. An arrangement for transmission of payload data that implements real-time applications between at least one first communication device and at least one second communication device which are designed in such a way that the payload data are transmitted as data packets during a communication connection, the data packets comprising first data packets, second data packets, and third data packets, the arrangement comprising:
a first communication device;
a second communication device, the second communication device having a communication connection with the first communication device;
at a first time period, the first communication device embedding at least one first data packet of the first data packets with first authentication information enabling authentication of the first communication device;
the first communication device transmitting the first data packets to the second communication device;
the second communication device receiving the first data packets and extracting the first authentication information embedded within the at least one first data packet of the first data packets;
upon a determination that the first authentication information authenticates the first communication device, the second communication device maintaining the communication connection and forwarding the first data packets for appropriate processing;
at a second time period that is after the first time period, and during the transmission of data packets between the first and second communication devices, the first communication device embedding at least one second data packet of the second data packets with first authentication information enabling authentication of the first communication device;
the second communication device receiving the second data packets an amount of time after the receipt of the first data packets and forwarding of the first data packets;
the second communication device extracting the first authentication information embedded within the at least one second data packet of the second data packets; and
upon a determination that the first authentication information authenticates the first communication device, the second communication device maintaining the communication connection and forwarding the second data packets for appropriate processing;
at a third time period that is after the second time period, and during the transmission of data packets between the first and second communication devices, the first communication device embedding at least one third data packet of the third data packets with first authentication information enabling authentication of the first communication device;
the second communication device receiving the third data packets an amount of time after the receipt of the second data packets and forwarding of the second data packets;
the second communication device extracting the first authentication information embedded within the at least one third data packet of the third data packets; and
upon a determination that the first authentication information authenticates the first communication device, the second communication device maintaining the communication connection and forwarding the third data packets for appropriate processing.

14. The arrangement of claim 13 wherein an amount of time between the first time period and the second time period is different than an amount of time between the second time period and the third time period.

15. The arrangement of claim 13 wherein an amount of time between the first time period and the second time period is an amount that is equal to an amount of time between the second time period and the third time period.

16. The arrangement of claim 13 wherein the payload data is not encrypted.

17. The arrangement of claim 13 wherein the data packets also comprise a plurality of fourth data packets and wherein during the communication connection:
at a fourth time period that is after the first time period and is during the transmission of the data packets between the first and second communication devices, the second communication device embedding at least one fourth data packet of the fourth data packets with second authentication information enabling authentication of the second communication device;
the second communication device transmitting the fourth data packets to the first communication device;

the first communication device receiving the fourth data packets and extracting the second authentication information embedded within the at least one fourth data packet of the fourth data packets; and upon a determination that the second authentication information authenticates the second communication device, the first communication device maintaining the communication connection and forwarding the fourth data packets for appropriate processing.

18. The method of claim 1 wherein the payload data is not encrypted.

19. The method of claim 1 wherein the first communication device is a personal computer, a telephone, a mobile computer device or a laptop computer and wherein the second communication device is a personal computer, a telephone, a mobile computer device, or a laptop computer.

20. The arrangement of claim 13 wherein the first communication device is a personal computer, a telephone, a mobile computer device, or a laptop computer and wherein the second communication device is a personal computer, a telephone, a mobile computer device, or a laptop computer.

\* \* \* \* \*